(12) United States Patent
Kanekal

(10) Patent No.: US 6,473,122 B1
(45) Date of Patent: Oct. 29, 2002

(54) METHOD AND APPARATUS TO CAPTURE HIGH RESOLUTION IMAGES USING LOW RESOLUTION SENSORS AND OPTICAL SPATIAL IMAGE SAMPLING

(76) Inventor: Hemanth G. Kanekal, 1534 Albatross Dr., Sunnyvale, CA (US) 94087

( * ) Notice: Subject to any disclaimer, the term of this patent is extended or adjusted under 35 U.S.C. 154(b) by 0 days.

(21) Appl. No.: 09/454,494

(22) Filed: Dec. 6, 1999

(51) Int. Cl.$^7$ .......................... H04N 3/14; H04N 5/225

(52) U.S. Cl. ....................... 348/219; 348/222; 348/302; 348/340

(58) Field of Search ................................. 348/218, 219, 348/302, 308, 390.1, 409.1, 415.1, 417.1, 335, 340; H04N 3/14, 5/225

(56) References Cited

U.S. PATENT DOCUMENTS

| | | | | |
|---|---|---|---|---|
| 4,383,170 A | * | 5/1983 | Takagi et al. ................ | 250/216 |
| 4,543,601 A | * | 9/1985 | Harada et al. ............... | 348/219 |
| 4,713,541 A |   | 12/1987 | Renaud et al. ............... | 250/231 |
| 4,843,468 A | * | 6/1989 | Drewery ...................... | 348/207 |
| 5,402,171 A | * | 3/1995 | Tagami et al. ............... | 348/219 |
| 5,557,677 A | * | 9/1996 | Prytz ........................... | 380/20 |
| 5,786,901 A | * | 7/1998 | Okada et al. ................ | 348/219 |
| 5,841,126 A |   | 11/1998 | Fossum et al. .............. | 250/208 |

FOREIGN PATENT DOCUMENTS

| | | | | |
|---|---|---|---|---|
| JP | 58-130677 | * | 8/1983 | ............ H04N/5/30 |

OTHER PUBLICATIONS

Allen et al., "Micromachine Wedge Stepping Motor", ASME Nov. 15–20, 1998 (Anaheim), pp. 1–6.

Rodgers et al., "Designing & Operating Electrostatically Driven Microengines", Sandia National Labs, pp. 1–10.

Yang et al., A Nyquist–Rate Pixel–Level ADC for CMOS Image Sensors, IEEE Journal of Solid–State Circuits, vol. 34, No. 3, pp. 348–356, Mar. 1999.*

Decker et al., A 256×256 CMOS Imaging Array with Wide Dynamic Range Pixels and Column–Parallel Digital Output, IEEE Journal of Solid–State Circuits, vol. 33, No. 12, pp. 2081–2091, Dec. 1998.*

* cited by examiner

Primary Examiner—Ngoc-Yen Vu
(74) Attorney, Agent, or Firm—Nguyen & Associates

(57) ABSTRACT

A high-resolution digital image capturing apparatus with variable resolution capability is presented. In accordance with the present invention, the image capturing apparatus implements a motion control mechanism to incrementally move the sensor array relative to a subject. A frame of the image is captured at each incremental position. The number of frames taken is essentially limited by the distance between adjacent sensors. The frames are subsequently processed and assembled to generate a picture with improved resolution. Accordingly, the image resolution is directly related to the number of frames taken. By using the concept of fractal geometry, the number of frames required for high image resolution may be reduced thereby essentially providing a compressing technique to reduce capturing and processing time. In so doing, a digital image capturing apparatus with variable resolution capability that is inexpensive, portable, and power efficient can be achieved.

24 Claims, 13 Drawing Sheets

METHOD AND APPARATUS TO CAPTURE HIGH RESOLUTION IMAGES USING LOW RESOLUTION SENSORS AND OPTICAL SPATIAL IMAGE SAMPLING

FIELD OF THE INVENTION

The invention generally relates to digital image capturing and more particularly to an image capturing apparatus using low-resolution sensors and optical spatial image sampling techniques.

BACKGROUND OF THE INVENTION

High resolution digital image capturing systems such as high-end digital camera 100 shown in FIG. 1A typically utilize Charge Couple Device (CCD) array 101, which consists of thousands of photo-sensitive cells, to sample the image and produce varying amounts of electrical charges in response to the amount of light received from the image subject via an optical lens (not shown). The collected electrical charges are then converted into digital bits representing the image using external Analog-to-Digital (ADC) converter 102. The digital bits are then provided to multiplexer 103 which selectively transfers them to Digital Signal Processor (DSP) 104 before being stored in a memory. Central Processing Unit (CPU) 105 is also normally required for general processing (e.g., data formatting, etc.), power management, data transfer, and other tasks. A typical CCD sensor array is capable of capturing very high-resolution images. However, a CCD array requires a specialized manufacturing process, other than standard Complementary Metal-Oxide-Semiconductor (CMOS) manufacturing process, and is therefore expensive. Additionally, having the CCD array separate from the ADC means that different manufacturing processes are required for the CCD array and the external ADC which drives up the cost. The external ADC also needs board layout restraints for optimal operation thereby further increasing the cost. In addition, a high performance specialized DSP is necessary to complement the CCD array which further increases the cost. As a result, in general, high-resolution digital cameras are very expensive. Additionally, a CCD array with its control circuit tends to have high power consumption.

Recently introduced high-resolution digital cameras such as that shown in FIG. 1B utilize CMOS sensor imagers wherein a CMOS-based array of sensors 121 is integrated with ADC 122 and multiplexer 123 on the same silicon substrate. In so doing, the more expensive CCD array is replaced by the less expensive CMOS sensor array. Moreover, separate manufacturing processes for the sensor array and ADC are no longer needed which tend to decrease the manufacturing cost. However, a high performance specialized DSP is still required to complement the CCD array which means that these high-resolution digital cameras are still rather expensive.

On the other hand, low-resolution digital cameras such as that shown in FIG. 1C utilize a CMOS-based array of pixel-level sensors 131 wherein CMOS sensor array 131 is integrated with digital interface circuit 132 coupled to CPU 133 via a system bus. Each of these pixel-level sensors integrates a photo-diode, an ADC, and a latch together and is capable of capturing fairly low-resolution images. Such a CMOS array of pixel level sensors is very inexpensive as well as consumes less power than its CMOS-based image sensor array counterpart discussed above. Moreover, separate manufacturing processes are not required for the sensor array and the digital interface circuit thereby reducing the associated manufacturing costs. As a result, such digital cameras are very inexpensive but are capable of only capturing and generating low-resolution images. Hence, there is a need for a high-resolution digital image capturing apparatus that is inexpensive.

U.S. Pat. No. 5,612,736 (hereinafter the '736 patent) teaches a digital camera wherein light from a subject is directed by camera lens to a Digital Micro mirror Device (DMD) array which consists of a plurality of mirrors. Each of these mirrors represents a single pixel of the subject image. These mirrors can be energized by a DMD driver according to a serial sequence wherein each mirror is physically rotated to direct the light from the pixel associated with the corresponding mirror to a detector or a light absorber, respectively, thereby switching between an ON position and an OFF position. A complete sequential scan of the pixel mirrors in the DMD array provides complete digital information as to the color and intensity of the image subject pixels. The sequencing digital information is then provided to an Analog-to-Digital converter (ADC) before being stored in memory which can subsequently be retrieved to generate a digital image. The digital camera of patent '736 captures the digital information of the image one pixel at a time which leads to only a serial stream of data which will need to be processed before the image is obtained. Moreover, because of the fixed number of pixel mirrors and the pixel mirrors can only be switched between an ON and an OFF position, the resolution of the images are therefore fixed. Furthermore, the digital camera of the '736 patent requires an array of mirrors which are expensive. The digital camera size is also controlled by the level of miniaturization of these mirrors which may greatly affect the cost.

U.S. Pat. No. 5,212,555 (hereinafter the '555 patent) teaches a digital camera utilizing a Spatial Light Modulator (SLM). An SLM may be an array of individually addressable optical elements (e.g., mirrors) representing pixels of an image. To this end, an SLM is similar to a DMD array. The SLM directs a series of pixel-reflected light beams to a single-cell photosensor. A control circuit switches the optical pixel elements between ON and OFF positions to either direct a light beam to the photosensor (ON position) or away from the photosensor (OFF position). The photosensor detects each pixel-reflected light beam at a time and generates an image signal in response. As an enhancement, a plurality of photosensors can be used wherein each photosensor is assigned to each optical pixel element. This allows multiple light beams from multiple optical pixel elements to be detected and processed in parallel. The image signal is then digitized by an ADC before being stored in memory. Like the digital camera of patent '736, the digital camera of patent '555 also has a fixed resolution because of the fixed number of the optical pixel elements that can only either be turned ON or OFF. In addition, like the digital camera of patent '736, the digital camera size is controlled by the level of miniaturization of the SLM which may greatly affect the cost.

Thus, a need exists for a high-resolution digital image capturing apparatus with variable resolution capability that is inexpensive, miniaturized, and power efficient.

SUMMARY OF THE INVENTION

Accordingly, the present invention provides a high-resolution digital image capturing apparatus with variable resolution capability that is inexpensive, miniaturized, and power efficient.

The present invention meets the above need with a digital image capturing apparatus comprising an imager circuit, a motion control mechanism, memory, and a processor. In one embodiment of the present invention, the imager circuit is used to capture image pixel data of an image object via an optical lens. The motion control mechanism, which is coupled to the imager circuit, is used to incrementally reposition the imager circuit relative to the image object. The repositioning allows the imager circuit to capture different frames of image pixel data of the image object at different positions. In other words, the repositioning allows existing photosensitive elements in the imager circuit to be reused in dead zones (i.e., gap between two adjacent photosensitive elements which has the equivalent benefits as having additional photosensitive elements. Memory is coupled to the imager circuit and stores the frames of captured image pixel data of the image object. The processor is coupled to the memory, the imager circuit, and the motion control mechanism. The processor combines and processes the frames of captured image pixel data into one image thereby improving the object image resolution.

In an alternate embodiment, the motion control mechanism is used to incrementally displace reflected light beams from the image object relative to the imager circuit to allow the imager circuit to capture different frames of image pixel data of the image object at different positions. Essentially, displacing the reflected light beams relative to the imager circuit has the same effects as moving the imager circuit relative to the object.

For either embodiments, the total number of captured frames may be greatly reduced without any significant loss of resolution by utilizing the concept of fractal geometry. By reducing the total number of captured frames, less time is required for capturing and processing thereby improving the system's operating time.

All the features and advantages of the present invention will become apparent from the following detailed description of its preferred embodiment whose description should be taken in conjunction with the accompanying drawings.

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details. In other instances well-known methods, procedures, components, and circuits have not been described in detail as not to unnecessarily obscure aspects of the present invention. Although the following description describes the present invention in the context of digital camera, it should be clear to a person of ordinary skill in the art that the present invention can be used in any digital image capturing device including still and moving images.

In accordance with the present invention, an integrated low resolution and low cost CMOS-based sensor array is utilized. In the preferred embodiment, a CMOS-based pixel-level sensor array is utilized to minimize power consumption. To improve the image resolution, the present invention implements a motion control mechanism to incrementally move the sensor array relative to a subject. A frame of the image is captured at each incremental position. The number of frames taken is essentially limited by the distance between adjacent sensors. The frames are subsequently processed and assembled to generate a picture with improved resolution. Accordingly, the image resolution is directly related to the number of frames taken. However, by using the concept of fractal geometry, the number of frames required for high image resolution may be reduced thereby essentially providing a compressing technique to reduce capturing and processing time. In so doing, a digital image capturing apparatus with variable resolution capability that is inexpensive, portable, and power efficient can be achieved.

Figure 1A:
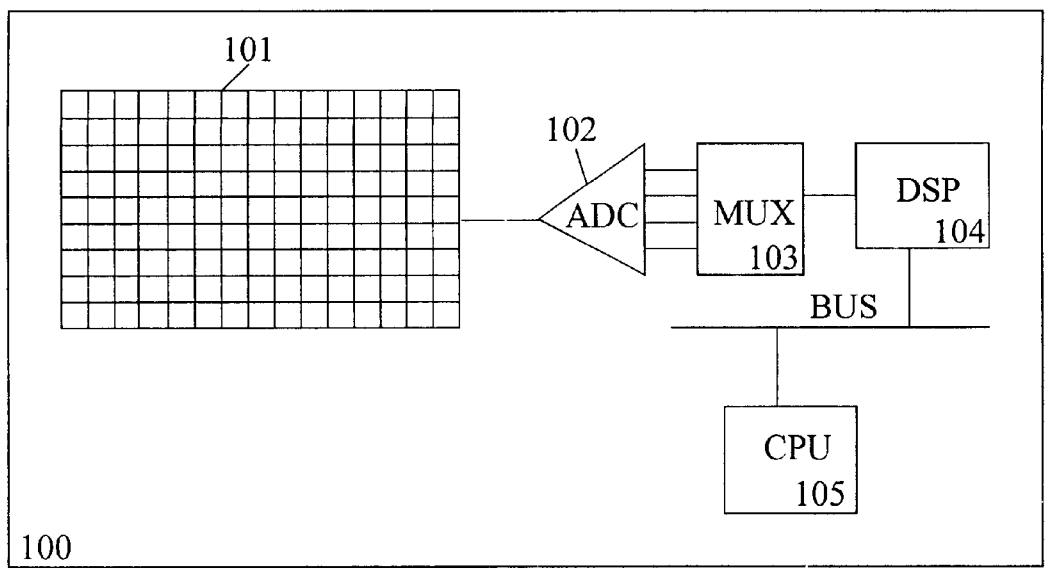
FIG. 1A is a block diagram illustrating a Prior-Art high-resolution digital camera 200 utilizing a Charge Couple Device (CCD) array.
Figure 1B:
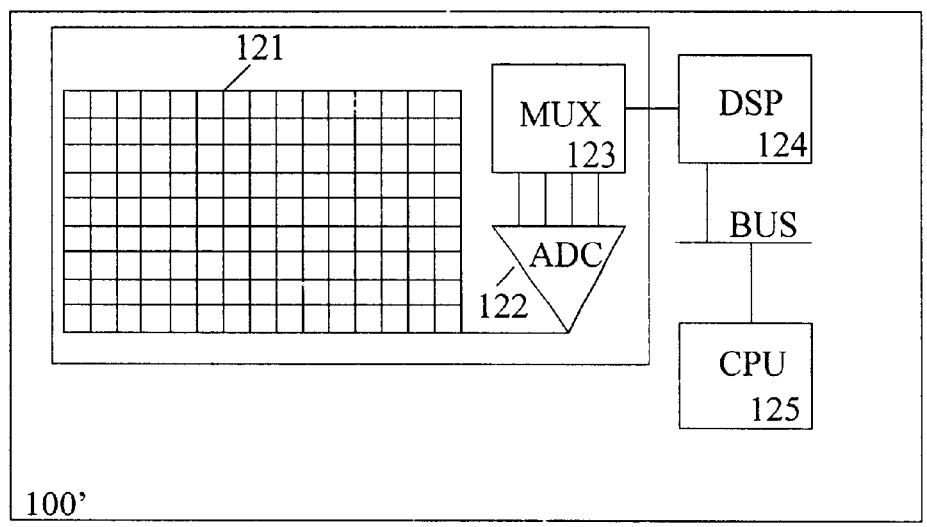
FIG. 1B is a block diagram illustrating a Prior-Art high-resolution digital camera utilizing a CMOS-based array of sensors integrated with an ADC on the same silicon substrate.
Figure 1C:
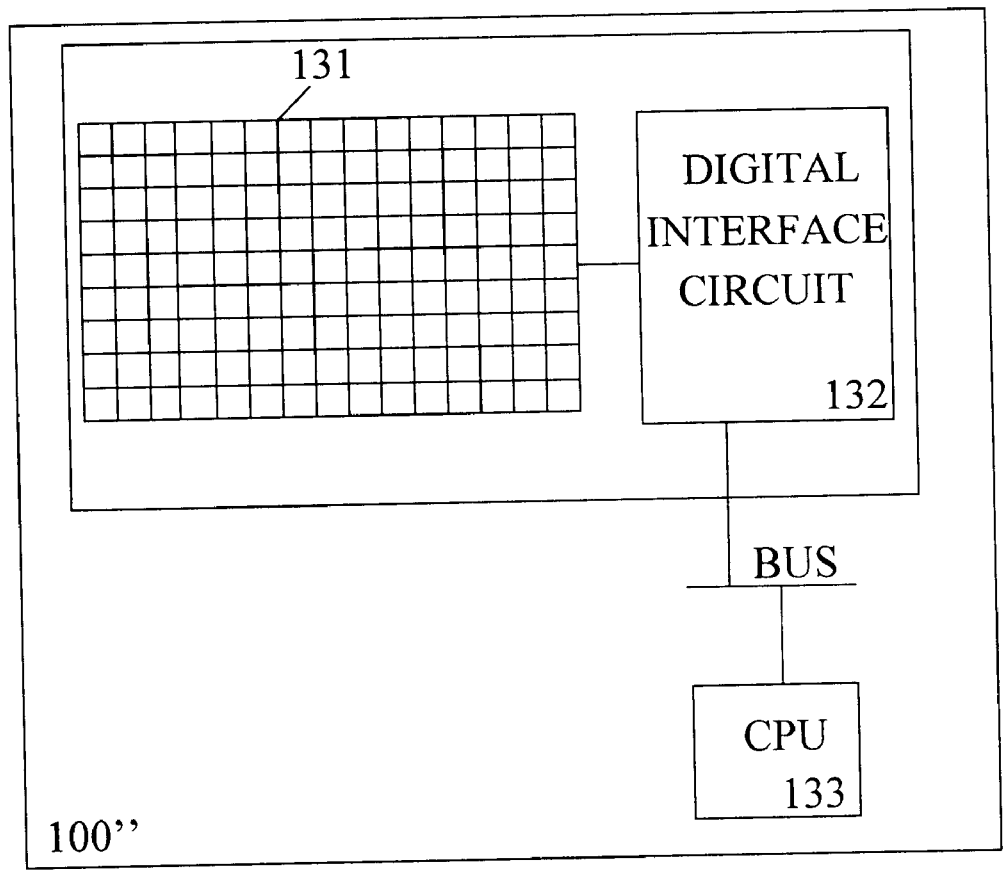
FIG. 1C is a block diagram illustrating a Prior-Art low-resolution digital camera utilizing a CMOS-based array of pixel level sensors wherein the CMOS sensor array with one ADC per sensor is integrated with a digital interface circuit.
Figure 2:
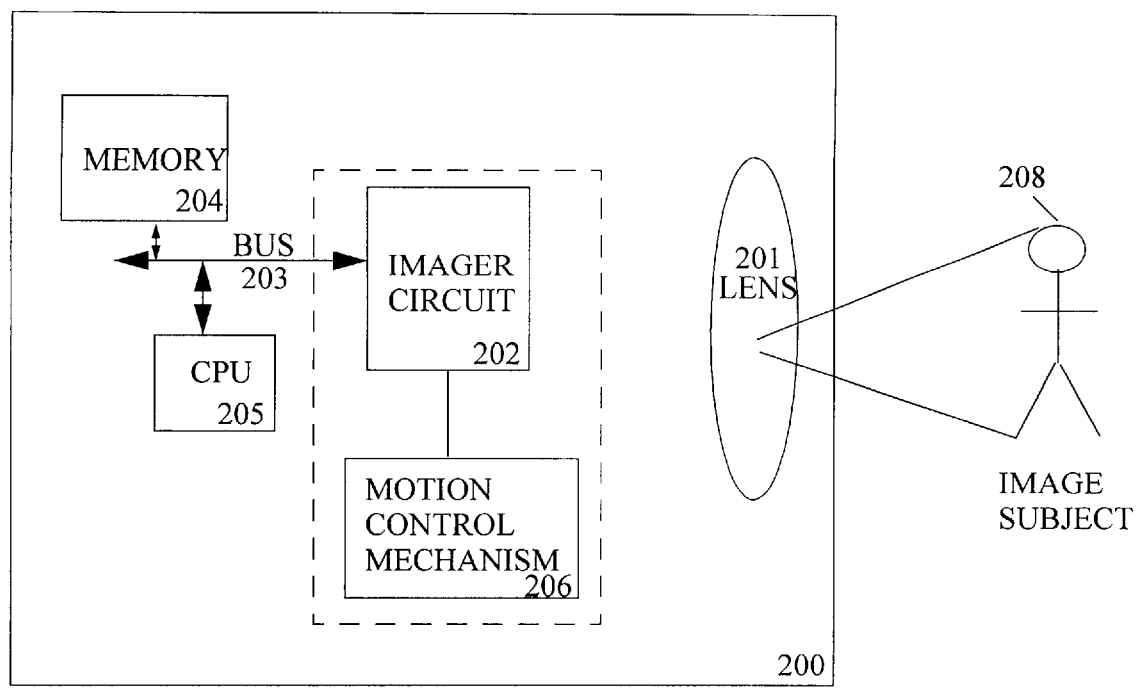
FIG. 2 is a block diagram of exemplary digital camera 200 which incorporates aspects of the present invention.

Reference is now made to FIG. 2 illustrating a highlevel block diagram of exemplary digital camera 200 which incorporates aspects of the present invention. As shown in FIG. 2, digital camera consists of optical lens 201, imager circuit 202, motion control mechanism 206, bus 203, memory 204, central processor 205, and motion control mechanism 206. Memory 204 may be any type of Random Access Memory (RAM) (e.g., DRAM, SRAM) or a combination of different types of memory such as Read Only Memory (ROM), RAM, and flash memory. In general, as subject 205 reflects light from its environment, optical lens 201 captures the subject's light paths (beams) and focuses them to imager circuit 202. Imager circuit 202 comprises an array of photosensors and their associated circuitry, wherein each photosensor represents a pixel of the subject image, and control circuitry. In response to the light received, each sensor converts the light to an electrical signal that is directly related to the light's intensity. The electrical signals from the photosensors are combined to make up a frame of the image. In one embodiment of the present invention, to improve the image resolution, motion control mechanism 206 incrementally moves CMOS-based imager circuit 202 relative to subject 208 so that the photosensors can be used to capture a different frame of the image. In another embodiment, motion control mechanism 206 incrementally displaces reflected light beams from the image object relative to the imager circuit so that the photosensors can be used to capture a different frame of the image. A dotted line is shown around both imager circuit 202 and motion control mechanism 206 to indicate that imager circuit 202 and motion control mechanism 206 may be integrated together on a same die. The different frames of the image are sent to central processor 205 via bus 203 for combining and processing into a higher resolution image before being stored in memory 204. The higher number of frames of an image is taken, the higher the image resolution will be. Moving the sensor array and capturing different frames of the image at these incremental locations and then subsequently combining them into one image essentially produce the same effect as having added photosensors in the sensor array.

Figure 3:
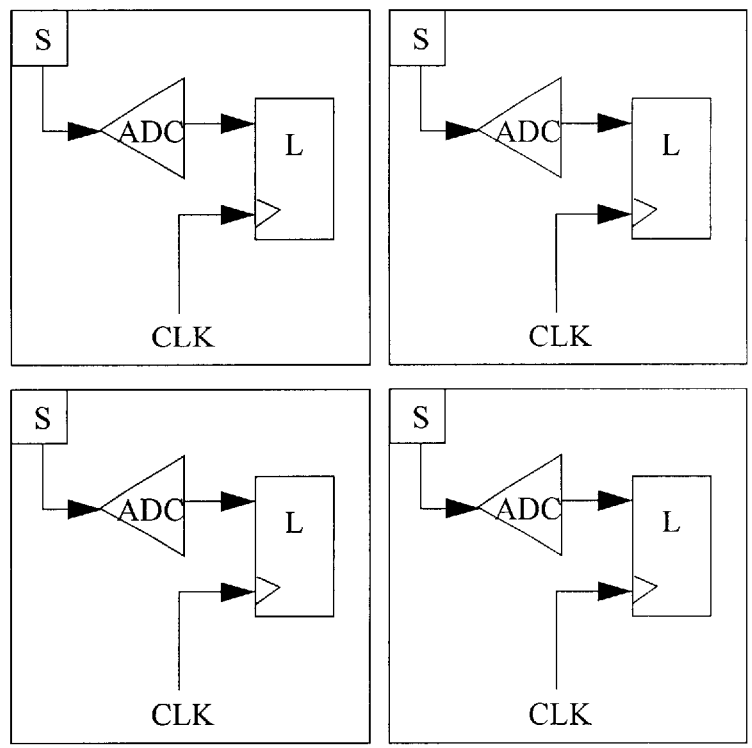
FIG. 3 illustrating an exemplary 2×2 block of sensor cells that is a part of the sensor array.

This improvement can be better explained by referring to now to FIG. 3 illustrating an exemplary 2×2 block of sensor cells that is a part of the sensor array. As shown in FIG. 3, each cell of the sensor array consists of, as an example, a photosensor element S, an Analog-to-Digital Converter (ADC), and a latch L. A photosensor does not take up all the real estate in a cell. Accordingly, there is a gap between any two adjacent photosensors which adversely affects the resolution of the image captured by digital camera 200 because each photosensor represents a pixel in the image. Under the present invention, the sensor array is moved relative to subject 208 so that a photosensor can capture a frame of the image at a location in between the gap. As such, the present invention has the effect of added photosensors in the sensor array thereby improving the resolution of the image captured by digital camera 200. By not requiring actual additional photosensors, the cost associated with the sensor array is greatly reduced. It is to be appreciated that the sensor cells shown in FIG. 3 are different from the preferred censor cell embodiment described below as FIG. 3 represents an alternate sensor cell configuration.

Figure 4:
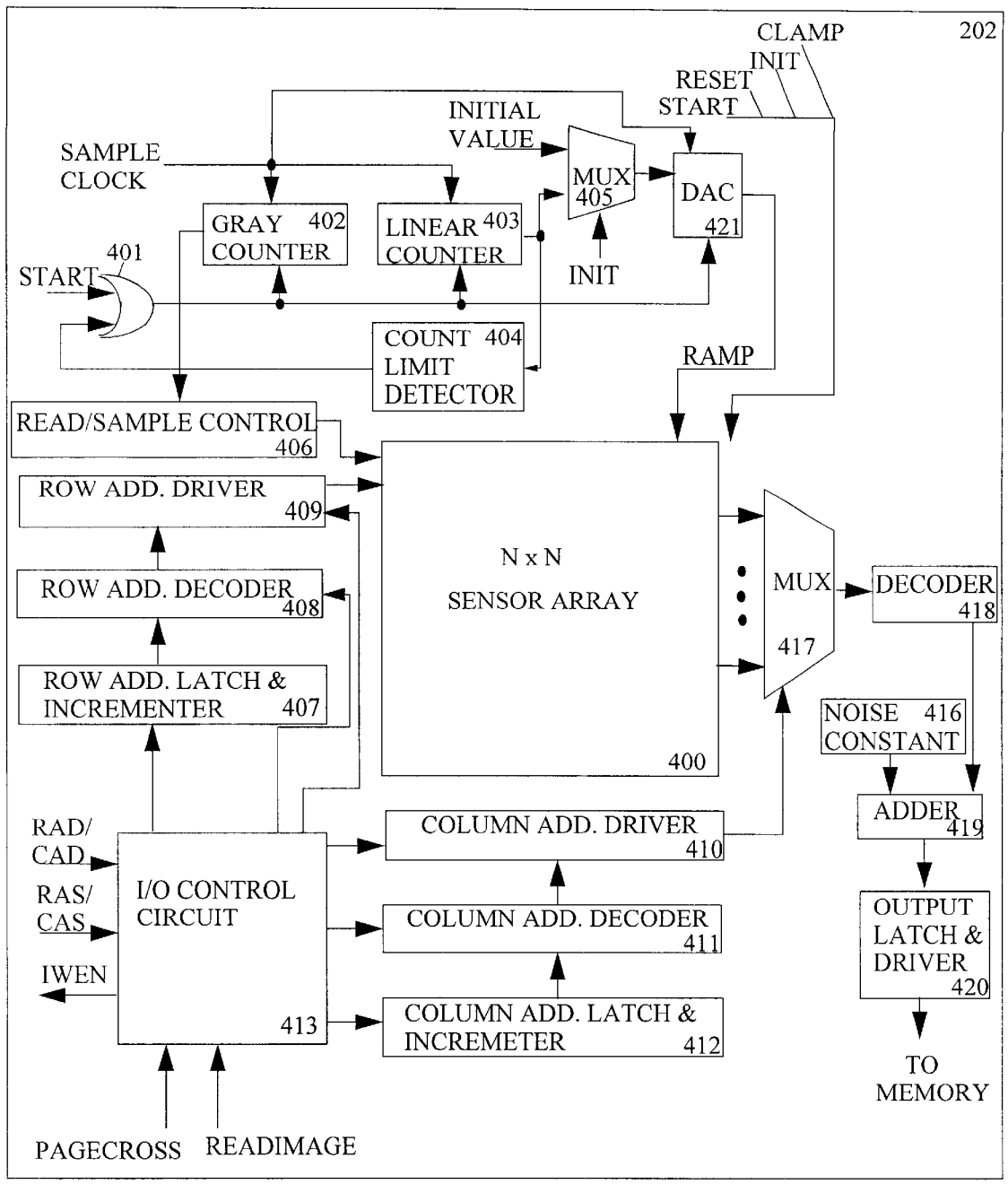
FIG. 4 is a diagram illustrating in greater detail an embodiment of imager circuit 202 which is CMOS-based.

Referring now to FIG. 4 illustrating in greater detail an embodiment of imager circuit 202 which is CMOS-based. In general, imager circuit 202 performs three different operations: photo-charge capture, sample, and read. As shown in FIG. 4, imager circuit 202 comprises sensor array 400, OR-gate 401, Gray counter 402, linear counter 403, count limit detector 404, multiplexer 405, read controller 406, row latch & incrementer 407, row decoder 408, row driver 409, column driver 410, column decoder 411, column latch & incrementer 412, I/O controller 413, noise constant generator 416, multiplexer 417, decoder 418, adder 419, output data latch and driver 420, and Digital-to-Analog Converter (DAC) 421. In the preferred embodiment, sensor array 400 consists of 256×256 pixel-level sensor cells each representing a pixel of the subject image. Each sensor cell functions as a capture and store circuit. In general, after the photosensor (photo sensitive) element accumulates the charge produced in response to the amount of light received in a predetermined time interval (e.g., the time duration that START signal is asserted), the voltage potential caused by the accumulated charge is used to generate a capture signal used in latching a digital counter value representing the pixel image data for a sensor cell. In essence, the accumulated charge is converted into equivalent digital data ready for storage in memory 204 of digital camera 200.

OR-gate 401, linear counter 403, count limit detect 404, multiplexer 405, and DAC 421 combine to generate a programmable analog ramp value to be used by the sensor cells in generating the signals to latch the count value of gray counter 402 representing the amount of light sampled by the photosensors. This is referred to as the capturing process. Central processor generates START signal whose duration is programmed by the user. In general, the duration of START signal can be adjusted longer for low light condition, shorter for bright light condition, and in between for other lighting conditions. Such unique adjustability allows START signal to be used to compensate for an underflow (e.g., low light) condition. START signal along with the output from count limit detector 404 are provided as inputs to OR-gate 401. The output of OR-gate 401 is provided as input to Gray counter 402, linear counter 403, and DAC 421. When START signal is deasserted LOW indicating that sampling by photosensors and/or the output of count limit detector 404 is LOW indicating that the count limit has not been reached, OR-gate 401 outputs a LOW signal to trigger Gray counter 402 and linear counter 403 to start counting. The output signal of OR-gate 401 is also provided to DAC 421 to indicate whether the conversion process is to be continued. On the other hand, when START signal is asserted indicating that the photosensors are being charged by light beams emanating or reflecting from the subject or the output of count limit detector is HIGH indicating that the count limit has been reached, OR-gate 401 outputs a HIGH signal to signal to gray counter 402 and linear counter 403 to stop counting and to DAC 421 to stop the conversion process.

Linear counter 403 outputs its count value to multiplexer 405 and count limit detector 404. Count limit detector 404 monitors the count to determine whether it has reached a predetermined limit. Multiplexer 405 receives as a second input an initial input value such as one (1). In response to INIT signal that acts as a select signal, multiplexer 405 allows either the initial input value or the count value from linear counter 403 to pass through as its output. As such, during initialization as depicted by INIT signal being asserted, multiplexer 405 outputs the initial input value which is used to initialize the comparators inside the sensor cells. At other times, multiplexer 405 outputs the count bits of linear counter 403. In addition to the output by OR-gate 401, DAC 421 also receives as inputs a sample clock signal and the output of multiplexer 405. The output of OR-gate 401 is used to enable DAC 421, the sample clock is used to drive DAC 421, and the output of multiplexer 405 is to be converted by DAC 421 into a ramp value. Such a ramp value is used in generating a latch signal for the storage circuitry that is part of each sensor cell for latching in the sampled pixel value representing the subject image.

Gray counter 402 and linear counter 403 are designed to generate equivalent count values at all time. Accordingly, gray counter 402 is synchronized with linear counter 403. Unlike linear counter 403 which provides the count value for use in generating the ramp value, gray counter 402 provides a count value that is equivalent to the count value from linear counter 403 for sampling by the sensor cells. More specifically, the binary bits of the count value from gray counter 402 are provided as inputs to the latches inside the sensor cells. In response to latch signals generated using the ramp value as discussed above, the latches selectively store (i.e., sample) the count value bits inside the sensor cells for use as the sampled image pixel values. In other words, gray counter 402 is used to help convert captured analog voltages into digital bits (i.e., analog-to-digital conversion). A gray counter is utilized for this task because it generates less noises and power surges than a linear counter. The reason is that unlike an increment or decrement operation in a linear counter which may involve multiple bit changes, an increment or decrement operation in a gray counter only involves one bit change. Such multiple bit changes may cause undesirable added noises and power surges that may affect the operation of the latches inside the sensor cells. Gray counters are well known in the art and are not further discussed here for the sake of simplicity and clarity.

The count value from gray counter 402 is provided to read/sample buffer 406 which is designed to isolate the outputs of gray counter 402 from the outputs of sensor array 400 during a read operation to prevent data corruption. In a sampling operation, the count value from gray counter 402 is passed through read/sample buffer 406 to all the sensor cells in sensor array 400 and no such isolation is needed. START, RESET, INIT, and CLAMP signals are provided to each sensor cell in sensor array 400.

Row address latch & incrementer 407, row address decoder 408, and row address driver 409 are used to access an individual row of sensor cells in sensor array 400. Likewise, column address latch & incrementer 412, column address decoder 411, and column address driver 410 are used to access an individual row of sensor cells in sensor array 400. By combining the ability to access a row and a column, any censor cell in sensor array 400 can be accessed for a read operation. Central processor 205 provides a row address using RAD signal and a column address using CAD signal (via I/O controller 413) to row address latch & incrementer 407 and column address latch & incrementer 412, respectively, which latch and hold the row and column addresses for subsequent processes (e.g., decoding). Row address latch & incrementer 407 and column address latch & incrementer 412 are designed to operate in both random addressing mode and automatically incrementing addressing mode. In random addressing mode, central processor 205 provides the row and column addresses randomly to access any sensor cell in any sequence. On the other hand, in incrementing addressing mode, central processor 205 provides only the initial row and column addresses, thereafter, row address & incrementer 407 and column address latch & incrementer 412 automatically increment or decrement the initial addresses to address the subsequent cell sensor in a predetermined sequence. Since there are 256×256 cell sensors in sensor array 400 in the preferred embodiment, only 8 bits are required for each row address and each column address.

Row address & incrementer 407 and column address latch & incrementer 412 provide the latched row and column addresses to row address decoder 408 and column address decoder 411 for decoding into individual row and column activating signals. In the preferred embodiment, row address decoder 408 and column address decoder 411 decodes the addresses into 256 row activating signals and 256 column activating signals which are provided to row address driver 409 and column address driver 410 to drive the addressed sensor array row and column.

I/O controller 413 generates internal control signals for row address latch & incrementer 407, row address decoder 408, row address driver 409, column address latch & incrementer 412, column address decoder 411, and column address driver 410. These internal control signals may be, for example, signals indicating which addressing mode (e.g., incremental or random) is involved. These internal control signals may also be timing signals, signals indicating whether a sensor array read operation or a sensor array sample operation is involved, and others. Additionally, I/O controller 413 generates a signal to load noise constant register 416 with a constant that is dependent on the subject image lighting condition. These internal control signals are generated in response to Row Address Select (RAS) signal and Column Address Select (CAS) signal as well as Row Address (RAD) signal and Column Address (CAD) signal from central processor 205 such that the address noise constant register 416 is decoded from RAD and CAD to load noise constant register 416. It should be clear to a person of ordinary skill in the art as to how to design such an I/O controller. Accordingly, for brevity, I/O controller 413 is not discussed any further here.

During a read operation, the drive signal from row address driver 409 selects (addresses) a corresponding row of sensor cells from sensor array 400 and signal them to output their stored image pixel data to multiplexer 417, the drive signal from column address driver 410 is then used as a select signal for multiplexer 417 to allow pixel data from a corresponding sensor cell to pass through as its output. Because the pixel data is encoded as a gray counter value, the pixel data is provided to decoder 418 to decode to complement binary numbers. The pixel data in complement binary number is then provided as an input to adder 419. Noise constant register 416 supplies a constant value as a second input to adder 419. As discussed earlier, noise constant register 416 outputs a constant that depends on the lighting condition-setting preset by the user. By adding the values of its two inputs, adder 419 essentially filters out undesirable noises as part of digital signal processing. The processed pixel data is then provided to output data latch and driver 420 for output. When PageCross signal is asserted it indicates that the end of a row in memory chip has been reached and when ReadImage signal is deasserted it indicates that a read operation has stopped.

Figure 4A:
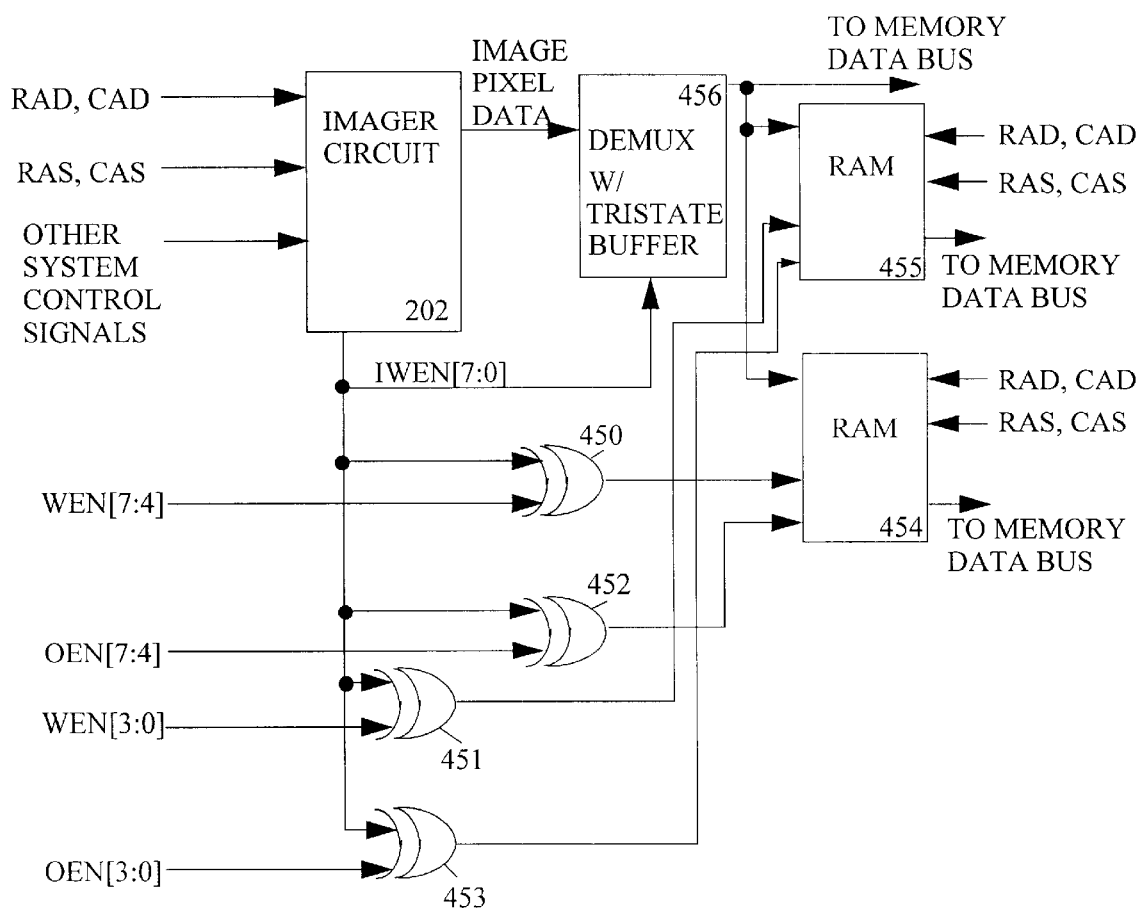
FIG. 4A is a diagram illustrating in greater detail the interface between central processor 205, memory 204, and imager circuit 202.

FIG. 4A illustrates in greater detail the interface between central processor 205, memory 204, and imager circuit 202. Such an interface shows exemplary hardware and connections required in a read operation to retrieve n-bits image pixel data from the sensor cells in sensor array 400 and store them in memory 204. At the beginning of a sensor array read operation, central processor 205 sends Row Address (RAD) signal to imager circuit 202. To help imager circuit 202 ensure the validity of the row address (e.g., address is intended for imager circuit 202 and is not stale), central processor 205 sends Row Address Select (RAS) signal to imager circuit 202. Generally, imager circuit 202 captures the row address at the falling edge of the RAS signal. Similarly, central processor 205 sends Column Address (CAD) signal to imager circuit 202. To help imager circuit 202 ensure the validity of the row address (e.g., address is intended for imager circuit 202 and is not stale), central processor 205 sends Column Address Select (CAS) signal to imager circuit 202. Generally, imager circuit 202 captures the column address at the falling edge of the CAS signal. By combining the row and column addresses, any sensor cell in the array can be addressed and its data retrieved.

To indicate when imager circuit 202 should output the retrieved image pixel data, central processor 205 sends imager circuit 202 an asserted ReadImage signal. ReadImage signal also reminds imager circuit 202 that only the lower address bits (e.g., lower 8-bits) of memory 204 are to be used for array address decoding. This is so because, in the preferred embodiment, the sensor array of imager circuit 202 is a 256×256 pixels array and each row of memory 204 can store an entire row of image pixel data from sensor array 400. However, before imager circuit 202 puts the retrieved image pixel data on the memory bus to be written into memory 204, imager circuit 202 asserts Image Write Enable (IWEN) signal to enable memory 204 for a memory write operation. In one embodiment, memory 204 may include two DRAM (or alternately SRAM) chips 454–455 wherein each DRAM chip can store many rows of image pixel data from sensor array 400. However, DRAM chips 454 and 455 must be write enabled before the image pixel data can be written into DRAM chips 454 and 455 in a memory write operation. XOR-gates 450 and 451 are used for this purpose. In the present embodiment, XOR-gates 450 include four (4) XOR-gates and XOR-gates 451 include four (4) XOR-gates. XOR-gates 450 and 451 receive as inputs selected bits of IWEN signal. XOR-gates 450 and 451 each receives as a second input write enable signal WEN[7:4] and WEN[3:0], respectively, from central processor 205 which modifies the memory control signals where the retrieved image pixel data is to be stored. As such, when the selected bits of IWEN signal are active HIGH, XOR-gates 450 outputs the invert of signal WEN[7:4] to enable DRAM chip 454 for writing. Similarly, when the selected bits of IWEN signal are active HIGH, XOR-gate 451 outputs the invert of signal WEN[3:0] to enable DRAM 455 for writing. Demultiplexer 456 arranges the image pixel data retrieved so that all the data from a row of sensor array 400 are provided to DRAM chips 454 and 455 in such a way that they can be stored in a memory row. Tri-state buffers may be used for image pixel data output by demultiplexer 456 to prevent data corruption. In concurrent to providing its output to DRAM chips 454 and 455, demultiplexer 456 drives its output (image pixel data) on memory data bus to make it available directly to CPU 205 thereby saving a time cycle that is required to read data stored in DRAM chips 454 and 455 (i.e., in a memory read operation).

To enable memory 204 (e.g., DRAM chips 454–455) for a memory read operation, selected bits of IWEN signal are provided as inputs to XOR-gates 452 and 453. In the present embodiment, XOR-gates 452 include four (4) XOR-gates and XOR-gates 453 include four (4) XOR-gates. XOR-gates 452 further receives as inputs read enable signal OEN[7:4] and XOR-gates 453 further receives as input read enable signal OEN[3:0] from central processor 205. Accordingly, XOR-gates 452 provide as output the invert of signal OEN[7:4] to disable DRAM chips 454 for reading when signal IWEN is active HIGH. Similarly, XOR-gates 453 output the invert of signal OEN[3:0] to disable DRAM chip 455 for reading when signal IWEN is active HIGH.

Figure 5:
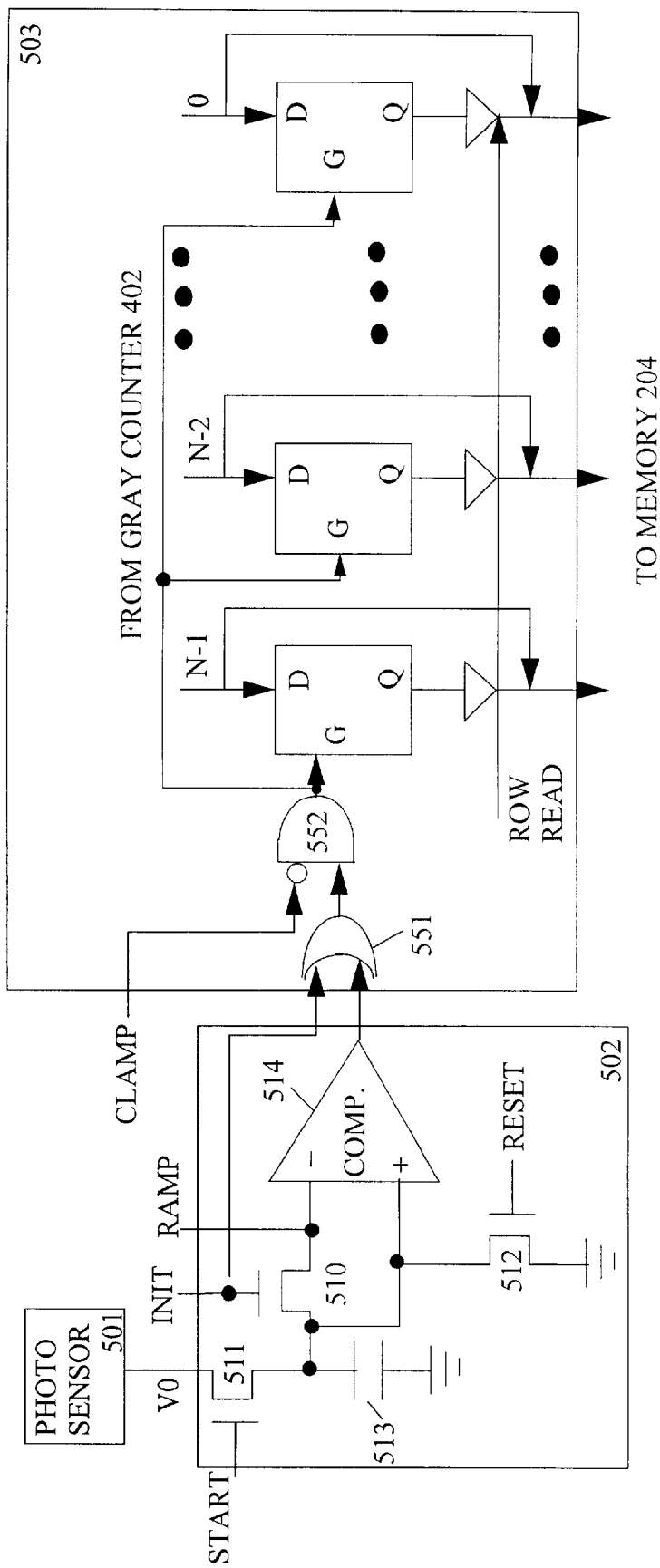
FIG. 5 is a block diagram illustrating exemplary cell sensor 500 that is a typical cell sensor in sensor array 400.

Referring now to FIG. 5 illustrating a block diagram of exemplary cell sensor 500 that is a typical cell sensor in sensor array 400. As shown in FIG. 5, cell sensor 500 comprises a photosensor (photosensitive) element 501, analog capture circuitry 502, and digital circuitry 503. Photosensor element 501 is described in greater detail below. In general, analog capture circuitry 502 is designed to determine when the level of charge generated by photosensor element 501 reaches the Ramp value and to generate a capture signal to so indicate. In one embodiment, analog capture circuitry comprises N-channel CMOS transistors 510–512, capacitor 513, and comparator 514. The gate of N-channel transistor 510 is connected to INIT signal, the drain of N-channel transistor 510 is connected to the first end of capacitor 513, and the source of N-channel transistor 510 is connected to the Ramp signal and to the negative (−) input of comparator 514. The gate of N-channel transistor 511 is connected to START signal, the source of N-channel transistor 511 is connected to the output of photosensor element 501, the drain of N-channel transistor 511 is connected to the first end of capacitor 513 and to the drain of N-channel transistor 510 as well as to the positive (+) input of comparator 514. The second end of capacitor 513 is connected to Ground. The gate of N-channel transistor 512 is connected RESET signal. The drain of N-channel transistor 512 is connected to the first end of capacitor 513 and the positive (+) input of comparator 514. The source of N-channel transistor 512 is connected to Ground.

Operationally, the following activation and deactivation sequence of RESET, INIT, and START signals is implemented in the image capturing process in accordance with the present invention. RESET signal is asserted to initialize all of sensor array 401. When RESET signal is asserted, N-channel transistor 512 is switched on to connect the first end of capacitor 513 to Ground thereby initializing capacitor 513. START signal may be asserted at the same time as RESET signal to switch on N-channel transistor 511 thereby draining any photo charge accumulated by the photosensor element 501. This allows analog capture circuitry 502 to be more sensitive in its performance. After both RESET signal and START signal are deasserted, INIT signal is then asserted to switch on N-channel transistor 510 to equalize the inputs of comparator 514 to an initial Ramp voltage value and to charge capacitor 513 to a voltage that represents the initial Ramp voltage value. Preferably, the initial Ramp voltage is sufficient to ensure that the output of comparator 514 reaches a logic HIGH before the image capture process begins. When INIT signal is deasserted at the end of the initialization process, N-channel transistor 510 is switched off and the Ramp voltage starts to be represented by the value of linear counter 403. At this time, the digital count value of linear counter 403 is at zero (0) and accordingly Ramp voltage is at level 0 (zero). Accordingly, comparator 514 initially outputs a logic HIGH signal which enables transparent latches in digital circuitry 503. As START signal is again asserted at the beginning of the charge capturing process (while no other signals are asserted thereby switching off transistors 510 and 512), it switches on N-channel transistor 511 to allow the photo-current generated by photosensor element 501 to charge up capacitor 513. The duration of START signal being asserted is dependent on the lighting condition set by the user. In the preferred embodiment, START signal duration is set by central processor 205. At the end of the capturing process, START signal is deasserted to switch off N-channel transistor 511. As START signal goes LOW, the counters (linear counter 403 and gray counter 402) starting incrementing their counts so the Ramp voltage, which now represents the incrementing count value of linear counter 403, is compared against the voltage potential induced by the accumulated photo-current on capacitor 513. When the Ramp voltage reaches the voltage potential across capacitor 513 (Vph), comparator 514 outputs a logic LOW signal to capture the gray count value from gray counter 402 provided to latches in digital circuitry 503. Hence, when the voltage Vramp is equal to Vph, it represents the image pixel voltage and the associated count value from gray counter 402 represent the pixel value.

In general, digital circuitry 503 latches in place the gray count value from gray counter 402 in response to a capture signal. In one embodiment, digital circuitry 503 comprises OR-gate 551, AND-gate 552, n latches, and n tri-state buffers. In the preferred embodiment, the n latches are transparent latches. OR-gate 551 receives as inputs the output of comparator 514 and INIT signal. Accordingly, OR-gate 551 generates a LOW logic enable signal only if both its inputs are LOW and a HIGH logic enable signal when either one or both its inputs are HIGH. The output of OR-gate 551 is provided as an input to AND-gate 552 whose second input is the invert of CLAMP signal. CLAMP signal is LOW after reset and is HIGH when count limit detector 404 determines that the count from linear detector 403 has reached a predetermined count. In this embodiment, the HIGH output from AND-gate 552 is used to enable the n latches and the LOW output is used to disable the n latches. In general, the n latches are enabled to allow their inputs to pass through as their outputs when the output of OR-gate 551 (capture signal) is HIGH indicating that the voltage potential of the accumulated charge has not reached the Ramp voltage value and CLAMP signal is LOW indicating that the count of linear counter 403 has not reached the limit. Conversely, when the output signal of OR-gate 551 is LOW indicating the accumulated charge has reached the Ramp voltage value or CLAMP signal is HIGH indicating that the count of linear counter 403 has reached its limit, the n latches are disabled thereby closing the latches. When n latches are disabled, the input data is said to be latched in place. In the present invention, each latch receives as input a corresponding bit of the gray count value from gray counter 402. Accordingly, the number of latches n in digital circuitry 503 is equivalent to the number of bits of gray counter 402. The output of each latch is connected to a corresponding one of n tri-state buffers which are controlled by row read driver signals from row address driver 409. When a tri-state buffer is enabled by the row read driver signal, its output can be in either a HIGH or LOW state depending on the output of the connected latch. When disabled, the tri-state buffer's output is in a neutral state. In so doing, the integrity of the latches' outputs to memory 204 can be assured (i.e., data corruption is prevented).

The INIT signal is turned on before capture to force open the n latches for the gray count (which is zero at this time) to pass through the n latches. Also, turning on INIT signal shorts the Ramp input and capacitor 513. As a result, comparator 514 switches the state of its output thereby allowing the input values to n latches to flow through. This is the beginning of the capture process.

As a summary from previous discussions, Grey counter 402 and linear counter 403 both counts upward at the rate of the system clock. The output of linear counter 403 is converted by DAC 421 to a continuously increasing output voltage such that the shape of this output voltage resembles a "ramp". Hence, this voltage is referred to as the Ramp voltage. The Ramp voltage is then fed to comparator 514 inside each sensor cell. Comparator 514 switches LOW when the Ramp voltage reaches the voltage across capacitor 513 which in turn closes the n latches in digital circuitry 503.

Figure 6:
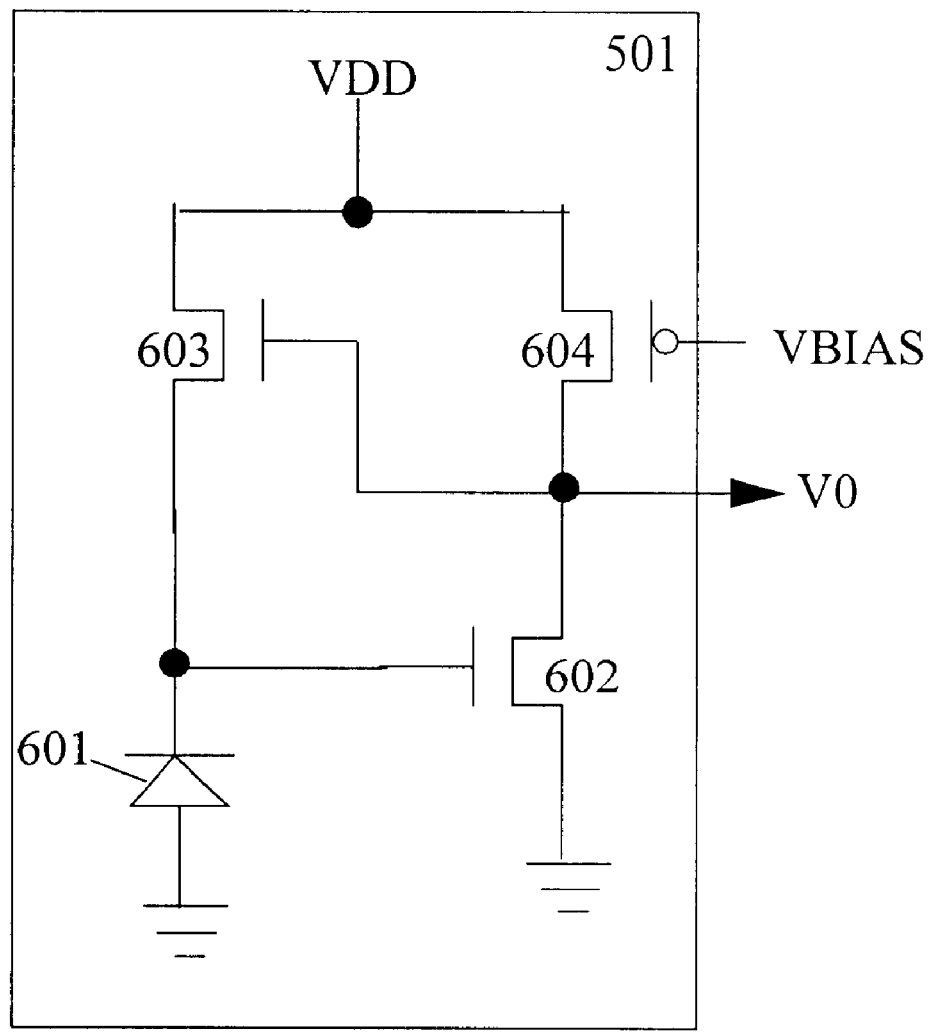
FIG. 6 is a diagram illustrating, as an example, photosensor element 501.

Reference is now made to FIG. 6 illustrating an exemplary photosensor element 501. As shown in FIG. 6, photosensor element 501 comprises photodiode 601, CMOS-based N-channel transistors 602–603, and CMOS-based P-channel transistor 604. The positive terminal of photodiode 601 is connected to the gate of N-channel transistor 602 and the negative terminal of photodiode 601 is connected to ground. The gate of N-channel transistor 602 is also used as the output for photosensor element 501. The positive terminal of photodiode 601 is also connected to the source of N-type transistor 603. N-channel transistor 603 has its drain connected to voltage Vdd and its gate connected to the drain of N-channel transistor 602. The source of N-channel transistor 602 is connected to ground. P-channel transistor 604 has its source connected to voltage Vdd, its drain connected to the drain of N-channel transistor 602, and its gate connected to a voltage Vbias. Operationally, when photodiode 601 receives light, it generates a current which creates a negative voltage at the gate of N-channel transistor 602. The voltage turns off N-channel transistor 602. As a result, a small positive voltage is generated at terminal Vo. Voltage Vbias is set LOW to turn on P-channel transistor 604. P-channel transistor 604 and N-channel transistor 602 form an amplifier of photodiode 601 output voltage. As the positive voltage Vo increases, it turns on N-channel transistor 603 which in turns increases the voltage applied to the gate of N-channel transistor 602. As a result, a feed back effect is produced at terminal Vo. In essence, N-channel transistor 602 and P-channel transistor 604 are used to invert and amplify the voltage generated by photodiode 601. This amplification is required to meet the sensitivity requirement of comparator 514.

Alternately, the photosensor elements taught in either U.S. Pat. No. 5,461,425, entitled "CMOS Image Sensor with Pixel Level A/D Conversion" or U.S. Pat. No. 5,376,813, entitled "Adaptive Photoreceptor Including Adaptive Element for Long-time Constant Continuous Adaption with Low Offset Insensitivity to Light" may be used as photosensor element 501. Both of which are herein incorporated by reference in their entirety.

Figure 7:
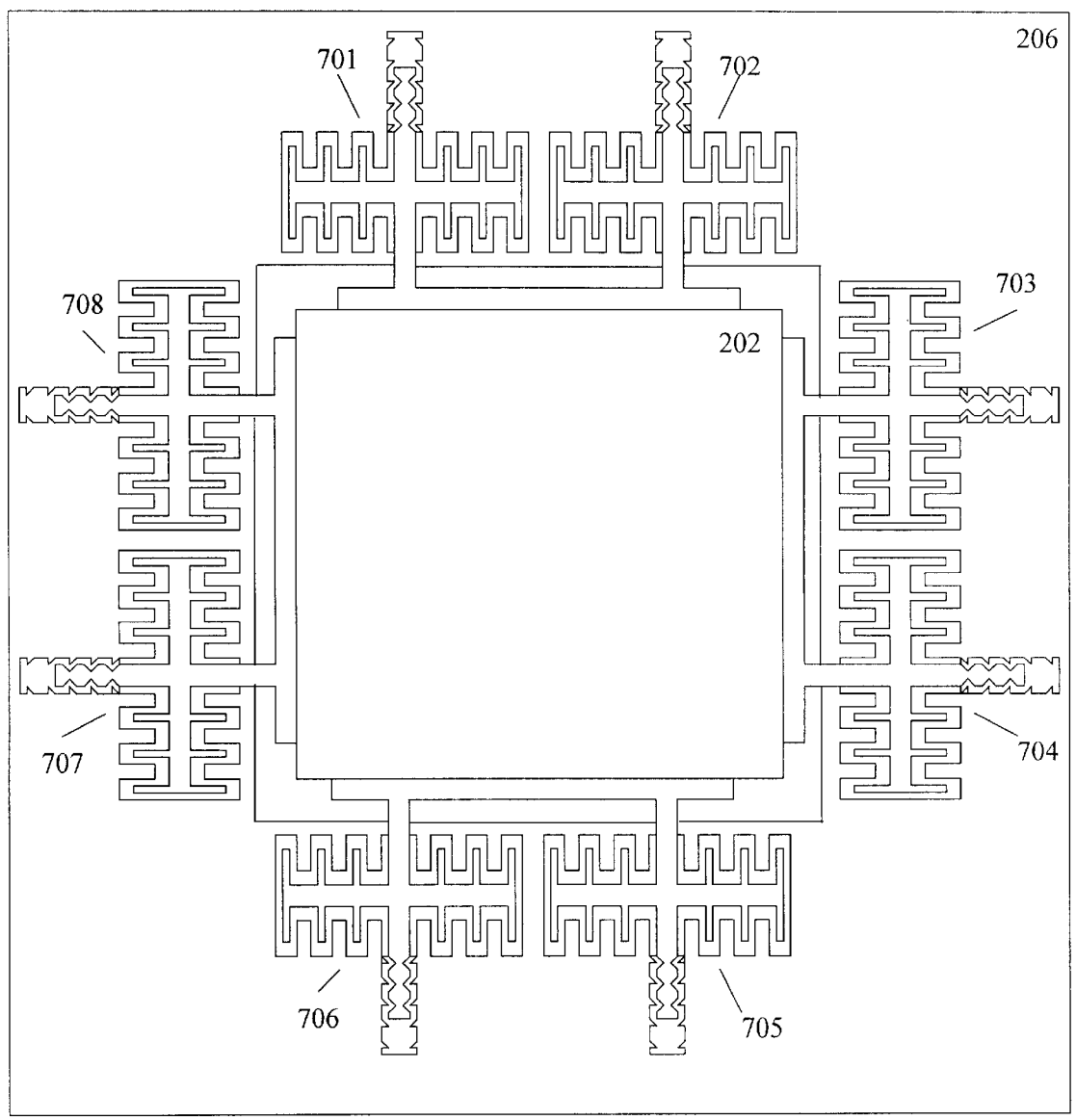
FIG. 7 is a diagram illustrating in greater detail an embodiment of motion control mechanism 206.

Referring now to FIG. 7 illustrating in greater detail an exemplary embodiment of motion control mechanism 206. In this embodiment, motion control mechanism 206 allows imager circuit 202 (which is shown integrated in a silicon die) to move linearly and independently along both the X-axis and Y-axis. In accordance with the present invention, such movement allows for more frames to be taken per image thereby improving image resolution. In this embodiment, motion control mechanism 206 involves eight substantially similar comb drive electrostatic actuators 701–708. For each axis, two actuator are used to move imager circuit 202 in the positive (+) direction and two actuators are used to move imager circuit 202 in the negative (−) direction. The four actuators are designed, coordinated, and controlled to move imager circuit 202 the same exact distance but in opposite directions. In other words, the four actuators combine to effectively pushing and pulling imager circuit 202 along the axis. Accordingly, comb drive actuators 701–708 are mechanically coupled to the four sides of the die containing imager circuit 202. It is to be appreciated that motion control mechanism 206 is designed such that imager circuit 202 is allowed to move independently along both the X axis and Y-axis.

Figure 8:
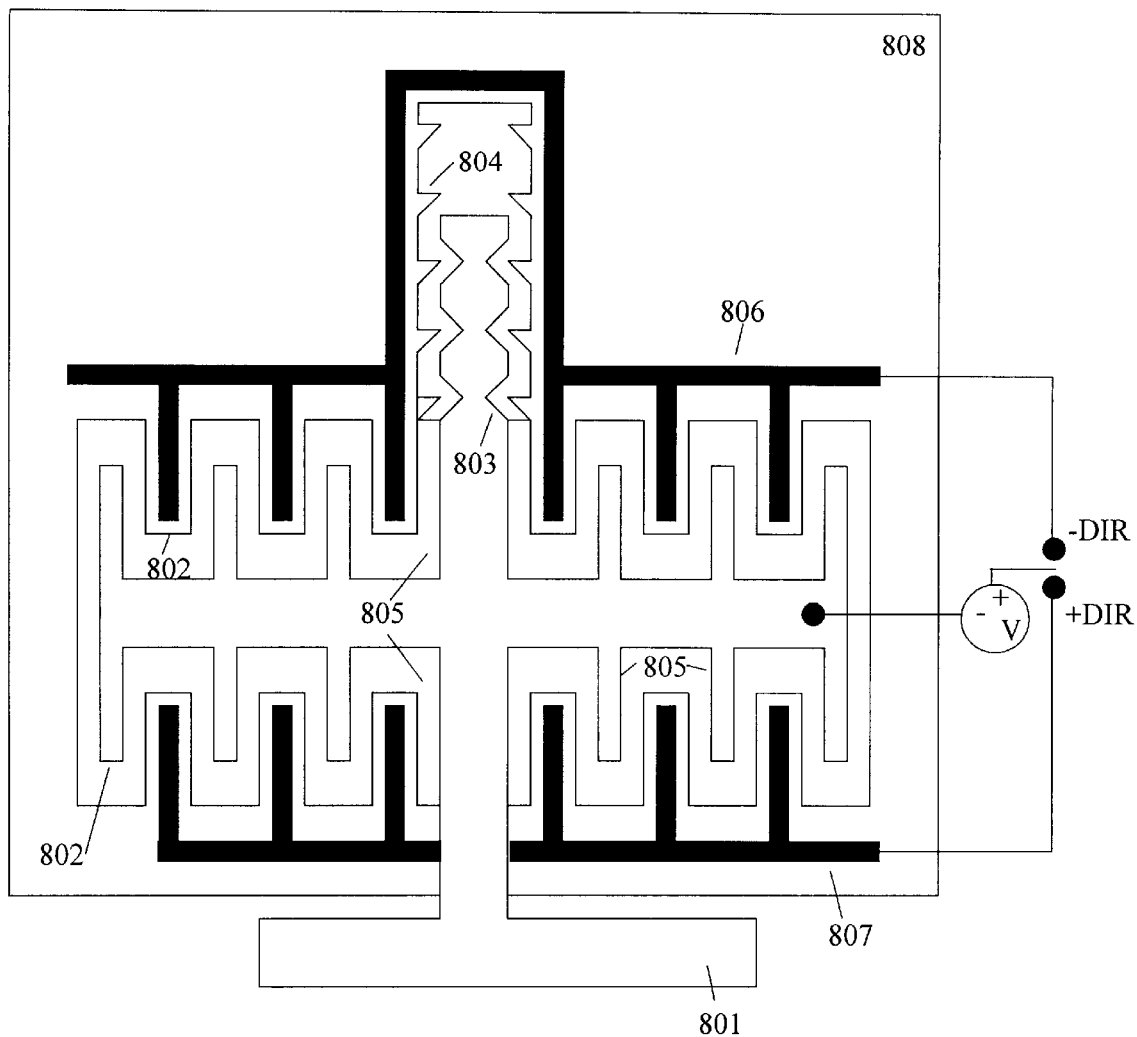
FIG. 8 is a diagram illustrating in greater detail a portion of comb drive actuator 701 utilized in motion control mechanism 206 of FIG. 7.

FIG. 8 illustrates in greater detail a portion of comb drive actuator 701 utilized in motion control mechanism. As its name suggested, comb drive actuator 701 includes a comb-like structure 801 with teeth 802 wherein each tooth 802 is designed to move inside a corresponding groove wherein all grooves 805 are parallel to the coordinate axis. Comb-like structure 801 (a.k.a. the shuttle) is connected at one end to a beam that are used to push the die and at the opposite end to gear stop device 803. Gear stop device 803 meshes with gear teeth 804 which are designed to be flexible and essentially used as a step movement control stop. In particular, gear teeth 804 are designed to be flexible enough that when comb-like structure 801 applies a sufficient force (via gear stop device 803) to tooth 804, tooth 804 bends over to allow comb-like structure 801 to pass over it. In response to an applied voltage, comb drive actuator generates an electrostatic force to move comb-like structure 801 along the grooves which in turn push or pull (depending on the motion direction) the die containing imager circuit 202 along the coordinate axis. Gear teeth 804 are designed so that the distance between any two teeth, which are flexible, represents a desired incremental movement of imager circuit 202 can be achieved every time a voltage is applied to comb drive actuator for a predetermined duration. Comb-like structure 801 is an electrode connected to the negative terminal of a voltage source. The positive terminal of the voltage source is connected to either fingers 806 or 807. Fingers 806 and 807 are terminals embedded in silicon substrate 808 inside comb-like structure 801 as shown in FIG. 8. Thus, when the positive terminal of the voltage source is connected to finger 806, comb-like structure 801 moves in the negative direction. Conversely, when the positive terminal of the voltage source is connected to finger 807, comb-like structure 801 moves in the positive direction. Comb drive actuators similar to comb drive actuator 701 are described, for example, in greater detail in "Designing and Operating Electrostatically Driven Microengines" by M. Steven Rodgers, Samuel L. Miller, Jeffry J. Sniegowski, and Glenn F. LaVigne (Sandia National Laboratory) which is herein incorporated by reference in its entirety. Flexible gear teeth for step movement control stop are described, for example, in greater detail in "Micromachine Wedge Stepping Motor" by James J. Allen and Heather K. Schriner (1998 ASME International Mechanical Engineering Congress and Exposition, Anaheim Calif.) which is herein incorporated by reference in its entirety.

Figure 9:
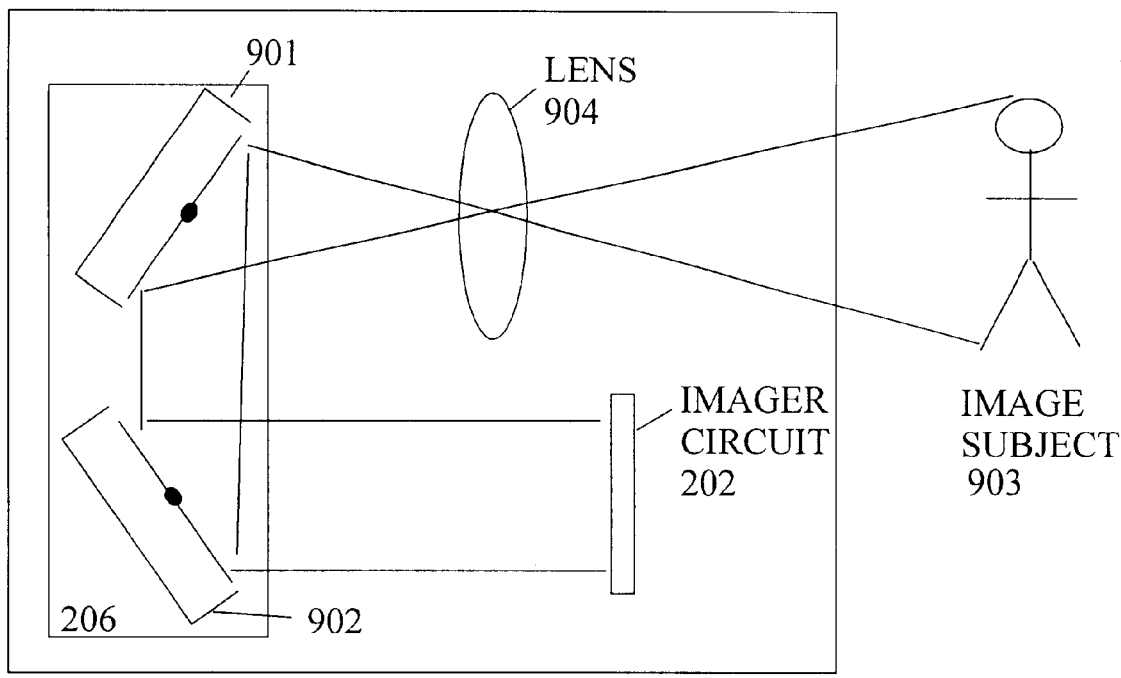
FIG. 9 is a diagram illustrating an alternate embodiment of motion control mechanism 206.
Figure 10:
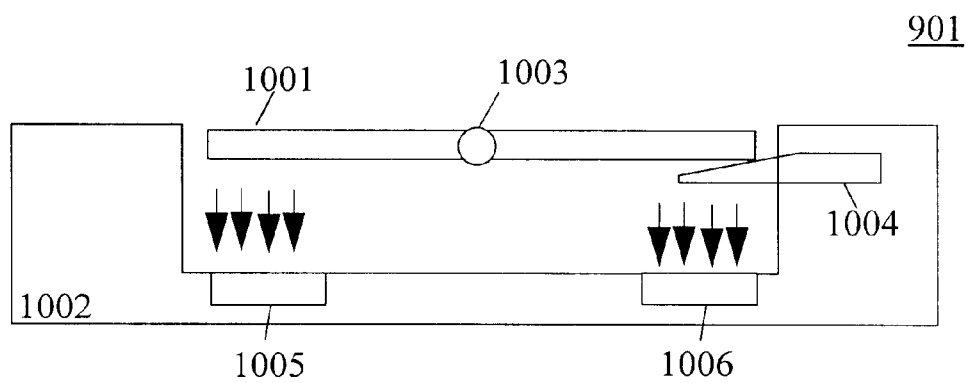
FIG. 10 is a diagram illustrating in greater detail mirrorassembly 901 of FIG. 9.

FIG. 9 illustrates an alternate exemplary embodiment of motion control mechanism 206. In this embodiment, motion control mechanism 206 consists of two substantially similar mirror assemblies 901–902. For reference purposes, FIG. 9 further shows object 903, optical lens 904, and imager circuit 202 which are provided to more clearly illustrate the concept of the embodiment. Briefly, lens 904 directs reflected light beams from object 903 to mirror assembly 901 which in turn directs the light beams by reflection to mirror assembly 902 which reflects the light beams to imager circuit 202. In this embodiment, mirror assemblies 901 and 902 are combined to allow imager circuit 202 to move relative to image object 903 along the X-coordinate axis and the Y-coordinate axis, respectively. More particularly, each mirror assembly is designed to rotate around a hinged axis which in turn allows the object's reflected light beams to be displaced along a coordinate axis relative to the photosensor elements of sensor array 400. Depending on the position and orientation of the hinged axis relative to the mirror assembly, displacement of the reflected light beams relative to sensor array 400 can be achieved. Such light beam displacements have the same effects as moving sensor array 400 (i.e., imager circuit 202) relative to object 903 to allow existing photosensor elements to capture additional image frames that are later processed to improve image resolution. In other words, pseudo photosensor elements are added to improve resolution. Accordingly, two mirror assemblies are used to provide displacement along the X and Y axes. Reference is now made to FIG. 10 illustrating in greater detail mirror assembly 901. Mirror assembly 902 is substantially similar to mirror assembly 901 and is therefore not illustrated here for the sake of brevity. As shown in FIG. 10, mirror assembly 901 consists of mirror 1001 that is positioned inside housing assembly 1002. Mirror 1001 is a single large mirror 400. Mirror 1001 can rotate around hinged axis 1003 that is attached to housing assembly 1002. Electrostatic fields 1005 and 1006 can be generated at predetermined locations in housing assembly 1002 to effectively attract mirror 1001 thereby causing it to rotate around hinged axis 1003. In particular, by alternately generating two electrostatic fields at opposite ends of mirror 1001 and in parallel to hinged axis 1003, mirror 1001 can be selectively rotated in either a clockwise or counter clockwise direction. Such electrostatic fields can be implemented using the teaching of the reference cited earlier. Actuator stop 1004 is used to control the angular rotation of mirror 1001. By moving (e.g., rotating) actuator stop 1004 in predetermined discrete steps relative to the height of housing assembly 1002, the angular rotation of mirror 1001 can be controlled. Stop 1004 can have a sloped surface such that as the stop moves forward or backward, mirror 1001 can move further up or down accordingly. In one embodiment, actuator stop 1004 may be a micro-electro-mechanical device which is taught, for example, in the aforementioned "Designing and Operating Electrostatically Driven Microengines" article.

Figure 10A:
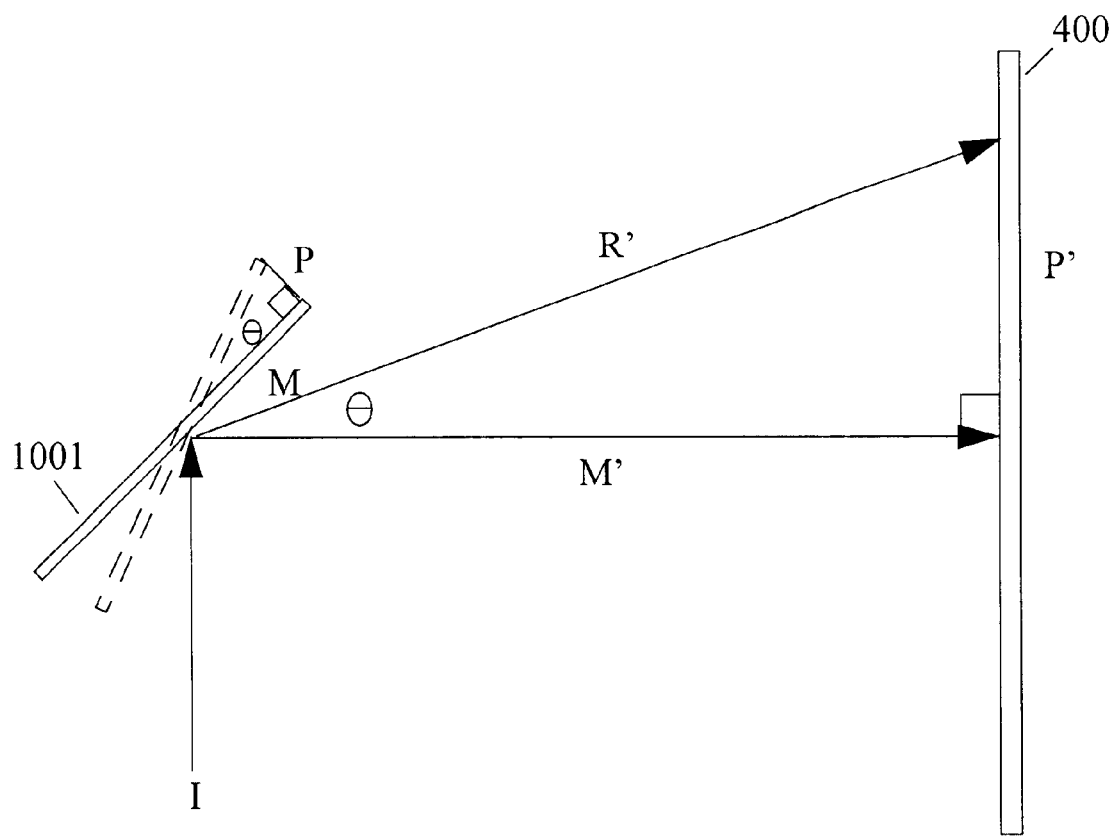
FIG. 10A is a diagram illustrating in greater detail the angular rotation of mirror 1001.

As an illustration, consider the following example. Assume that photosensor elements in sensor array 400 are square-shaped and have a dimension of 5 microns by 5 microns. Assume also that any immediately adjacent photosensor elements are placed 15 microns center-to-center apart. Accordingly, the maximum displacement distance allowed before any image pixel data overlap occurs is 10 microns (i.e., 15 microns–5 microns). It may, for example, require two (2) linear discrete steps at 5 micron per step relative to sensor array 400 to cover this distance. Two actuator stops 1004 are then set along the height of housing assembly 1002 to ensure the aforementioned linear discrete steps of 5 microns. FIG. 10A is used as an example to better illustrate how the angular rotation of mirror 1001 translates to light beams displacements. As shown in FIG. 10A, image object's light beam I is directed to mirror 1001 in turn directs reflected light beam R to sensor array 400. As dictated by the laws of physics, when mirror 1001 rotates about the hinged axis by an angle θ, reflected light beam R is also angularly displaced by angle θ. The displaced reflected light beam R is represented by reflected light beam R'. From basic geometry:

$$P/M = P'/M' \qquad (1)$$

where P and M represent the height and base of a right triangle formed between the initial and rotated positions of mirror 1001 and P' and M' represent the height and base of a right triangle formed between reflected light beam R and angularly displaced reflected light beam R'. As such, P represents the linear displacement of mirror 1001 that occurs as a result an angular rotation of mirror 1001 by angle θ. In other words, M is ½ the length of mirror 1001 which is a known constant, M' is the distance between mirror 1001 and imager circuit 202 which is another known constant, and P' is the linear displacement step relative to sensor array 400 (e.g., 5 microns linear step from the above example).

From equation (1), $$P = P' * (M/M') \qquad (2)$$

Since P', M', and M are all predetermined constant, displacement P can easily be determined using equation (2).

Figure 11:
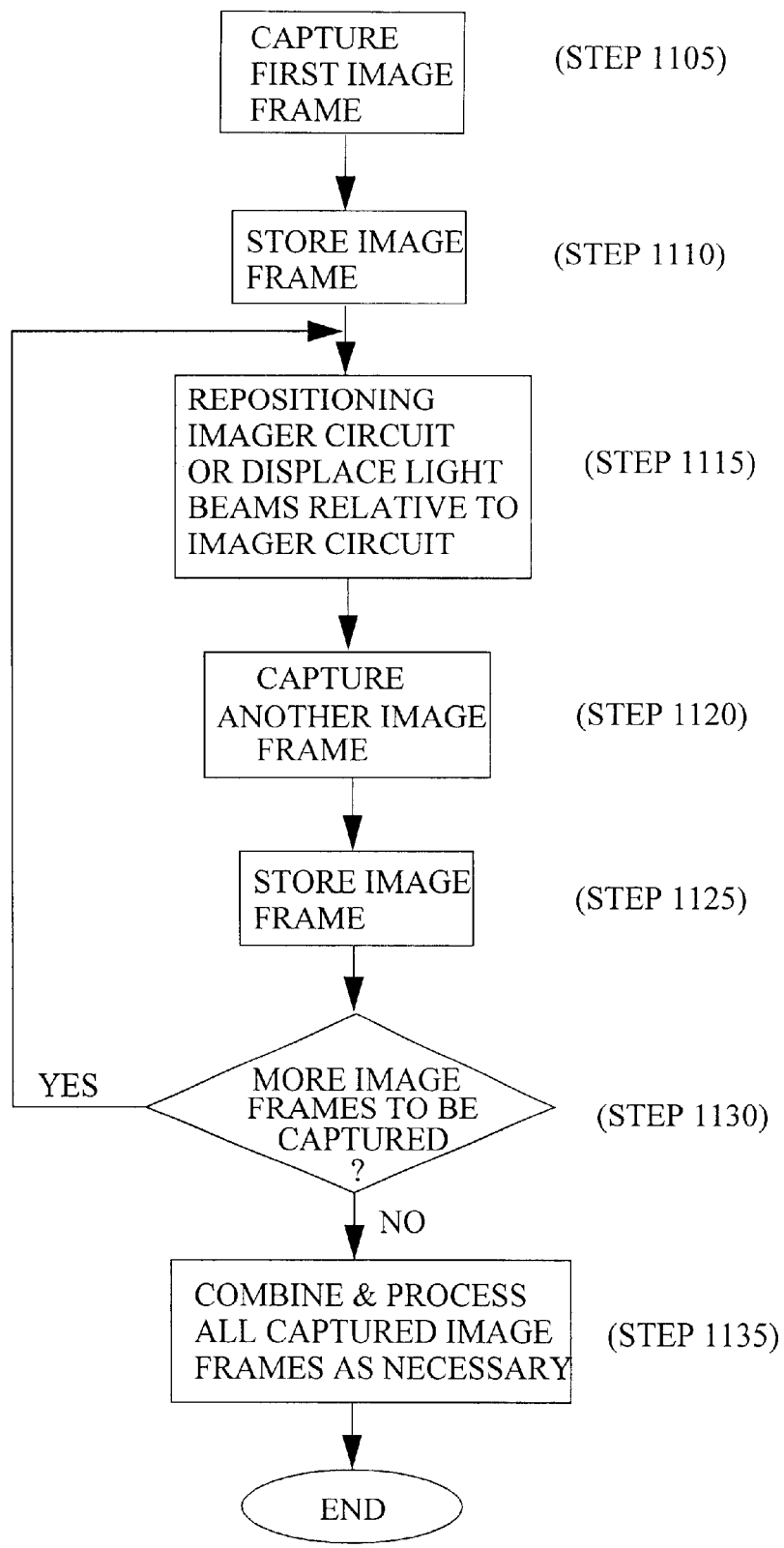
FIG. 11 is a system level flow chart summarizing the steps of the present invention.

Reference is now made to FIG. 11 illustrating a system level flow chart summarizing the steps of the present invention. In an exemplary embodiment, these steps are carried out when central processor 205 executes instructions stored in memory 204. In accordance with the present invention, when an image of a subject is captured using the disclosed apparatus, the image resolution is limited by the available photosensor elements available in sensor array 400. Each capture at any instant of time constitute an image frame. Due to the associated circuitry required for each photosensor element 501, there are "dead zones" between any two adjacent photosensor elements 501. A dead zone is an area where there is a lack of photosensor element. Because a dead zone introduces a gap in the image captured, such a gap adversely affects the resolution of the image. In accordance with the present invention, dead zones can be minimized by moving the array sensor relative to the subject (e.g., in the X and Y directions) so that a photosensor element "occupies" part of the dead zone. Each time the array sensor is moved, a different image frame is captured. In so doing, pseudo-photosensor elements are added to minimize the dead zone effects. This process is repeated until just prior to the occurrence of a sensor overlap. At that point, all the captured image frames are processed by central processor 205 to generate a high-resolution image of the subject. The number captured image frames required for such a high-resolution image may be reduced by using a well-known concept of fractal geometry which has been used in video compression. Discussion of fractal geometry imaging can be found, for example, in "Fractal Imaging" by Ning Lu (Academic Press 1997) which is herein incorporated by reference in its entirety.

Figure 12:
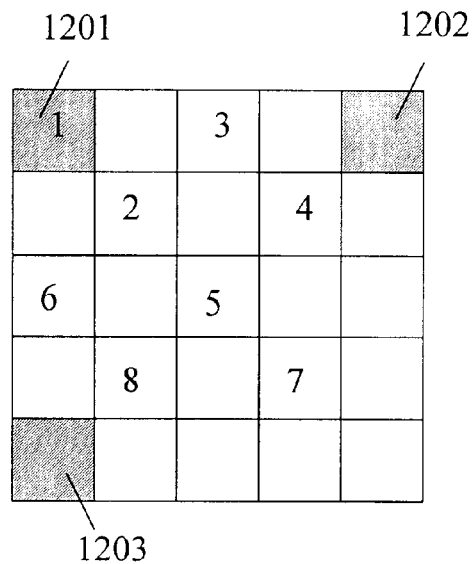
FIG. 12 is a diagram illustrating an example of how fractal geometry can reduce the number of image frames required in accordance with the present invention to generate a high resolution final image.
Figure 12A:
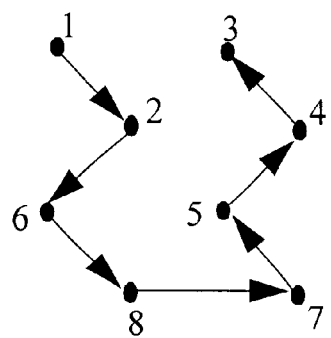
FIG. 12A is a diagram illustrating an exemplary displacement path.

As an example of the application of fractal geometry to reduce the number of captured image frames in accordance with the present invention, consider the following example shown in FIG. 12 which illustrates adjacent sensor cells 1201, 1202, and 1203 represented by shaded squares. As shown in FIG. 12, there are 3 linear discrete steps between adjacent sensor cells 1201 and 1202, wherein each discrete step is represented by a square. Accordingly, 4 captured image frames may be required to minimize the effects of the dead zone between adjacent sensor cells 1201 and 1202 (i.e., along the X-axis). Similarly, there are 3 linear discrete steps between adjacent sensor cells 1201 and 1203 wherein each discrete step is represented by a square. As such, 4 captured image frames may be required to minimize the effects of the dead zone between adjacent sensor cells 1201 and 1203 (i.e., along the Y-axis). Hence, without a compression technique, a total of 16 image frames have to be captured to reduce the dead zone effect between adjacent sensor cells. Using fractal geometry, the total number of captured image frames may be reduced without a significant decrease in resolution. Under fractal geometric theory, the captured image frames and their displacement sequence are dictated by fractal geometric equations. For illustration purposes in FIG. 12, the captured image frames as suggested under fractal geometric theory are 8 (eight) as represented by squares with reference numbers 1–8. The captured image frames under fractal geometric theory does not count the squares occupied by adjacent sensor cells 1202 and 1203 because counting them would signify an overlap. Hence, the total number of captured image frames are reduced by fifty (50) percent under fractal geometric theory which significantly reduces the amount of processing time and power required to produce the final image. As an exemplary objective, to minimize the displacement distance and therefore the time associated with image capturing, the captured image frames may be taken according to a predetermined sequence such as that shown in FIG. 12A. In particular, FIG. 12A illustrates, as an example, the following displacement sequence 1-2-6-8-7-5-4-3 wherein the initial starting position (5) is denoted by a white dot. It should be clear to a person of ordinary skill in the art that other displacement sequences designed to achieve the same or different objectives are also under the scope of the present invention. Moreover, the displacement sequence may constitute an encryption of the image thereby providing a means of secure data acquisition because a predetermined sequence is required for image processing and the predetermined sequence is known only to the user. In other words, while image data associated with each movement of the image with respect to the sensor array is stored, the pixel data in each of the image may be read out only according to a manner prescribed by the user. Hence, there is encryption of image data.

Referring now back to FIG. 11, in step 1105, a first image frame is captured. This image frame is then stored for subsequent access (step 1110). Next, array sensor 400 is moved relative to the subject by a predetermined increment for the first embodiment of motion control mechanism 206 (step 1115). For the alternate embodiment of motion control mechanism 206, step 1115 involves displacing the light beams relative to imager circuit. Another image frame is then captured (step 1120). Store the new image frame (step 1125). Determine whether all the predetermined number of image frames has been captured (e.g., as suggested under fractal geometry) (step 1130). By knowing the size of a photosensor element and the averaged gap, the number of photosensor elements that can fit between two adjacent two photosensor elements in both the X and Y directions can be determined. A count is kept to help determine if all the image frames have been captured. If there are still image frames to be captured, go back to step 1115. Otherwise, combine and process all the captured image frames to generate a higher resolution image as necessary (step 1135).

The preferred embodiment of the present invention, a high-resolution digital image capturing apparatus with variable resolution capability that is inexpensive, miniaturized, and power efficient, is thus described. While the present invention has been described in particular embodiments, the present invention should not be construed as limited by such embodiments, but rather construed according to the below claims.

What is claimed is:

1. A digital image capturing apparatus comprising:
   a CMOS-based imager circuit for capturing complete frames of image pixel data of an image object via an optical lens;
   a motion control mechanism coupled to the imager circuit for incrementally repositioning the imager circuit relative to the image object to allow the imager circuit to capture different complete frames of image pixel data of the image object at different positions;
   memory coupled to the imager circuit for storing frames of captured image pixel data of the image object; and
   a processor coupled to the memory, the imager circuit, and the motion control mechanism for combining and processing the frames of captured image pixel data into one image thereby improving the object image resolution, wherein the imager circuit is incrementally repositioned according to a predetermined sequence designed to reduce the number of frames of captured image pixel data, wherein the reduced number of frames of captured image pixel data are independent of a physical arrangement of sensor cells of the imager circuit.

2. The digital image capturing apparatus of claim 1, wherein the predetermined repositioning sequence is based on equations derived from fractal geometry.

3. The digital image capturing apparatus of claim 1, wherein the time for frame read-out is adjustable to accommodate different data requirements.

4. The digital image capturing apparatus of claim 1, wherein the imager circuit comprises:
- a CMOS-based sensor array having a plurality of sensor cells coupled to the processor, wherein each sensor cell receiving a reflected light beam from the image object thereby capturing a pixel data of the image object;
- an address circuit connected to the sensor array for selectively accessing the sensor cells to retrieve captured pixel data; and
- an output circuit connected to the address circuit, the memory, and to the processor for digitally processing and outputting captured pixel data to the memory.

5. The digital image capturing apparatus of claim 4, wherein the sensor cells capturing accumulated charge generated in response to reflected light beams from the image object, the sensor cells converting voltages associated with the accumulated charge into digital pixel data, the sensor cells locally storing the digital pixel data.

6. The digital image capturing apparatus of claim 5, wherein each sensor cell comprising:
- a photosensor element for generating charge in response to an amount of light received;
- an analog circuit connected to the photosensor element and coupled to the processor, the analog circuit generating a captured signal indicating whether the accumulated charge generated by the photosensor element reaches a ramping voltage associated with an incrementing first count value; and
- a n-bit latching circuit connected to the analog circuit, the latching circuit receiving as input a second count value that is equivalent to the incrementing first count value, the latching circuit latching the second count value in response to the captured signal indicating the accumulated charge generated by the photos sensor element reaches the ramping voltage associated with the incrementing to best count value thereby generating the digital pixel data, wherein the time for frame read-out is adjustable to accommodate different data requirements.

7. The digital image capturing apparatus of claim 6, wherein the second count value is generated by a gray counter and the incrementing first count value is generated by a linear counter.

8. The digital image capturing apparatus of claim 1, wherein the motion control mechanism comprising:
- a first micro-electro-mechanical device coupled to the imager circuit to move the imager circuit along a first coordinate axis thereby allowing the imager circuit to capture different complete frames of image pixel data of the image object at different positions; and
- a second micro-electro-mechanical device coupled to the imager circuit to move the imager circuit along a second coordinate axis thereby allowing the imager circuit to capture different complete frames of image pixel data of the image object at different positions.

9. A digital image capturing apparatus comprising:
- a CMOS-based imager circuit for capturing complete frames of image pixel data of an image object via an optical lens;
- a motion control mechanism for incrementally displacing reflected light beams from the image object relative to the imager circuit to allow the imager circuit to capture different complete frames of image pixel data of the image object at different positions;
- memory coupled to the imager circuit for storing frames of captured image pixel data of the image object; and
- a processor coupled to the memory, the imager circuit, and the motion control mechanism for combining and processing the frames of captured image pixel data into one image thereby improving the object image resolution, wherein the reflected light beams are incrementally displaced according to a predetermined sequence designed to reduce the number of frames of captured image pixel data, wherein the reduced number of frames of captured image pixel data are independent of a physical arrangement of sensor cells of the imager circuit.

10. The digital image capturing apparatus of claim 9, wherein the predetermined displacing sequence is based on equations derived from fractal geometry.

11. The digital image capturing apparatus of claim 9, wherein the time for frame read-out is adjustable to accommodate different data requirements.

12. The digital image capturing apparatus of claim 9, wherein the imager circuit comprises:
- a CMOS-based sensor array having a plurality of sensor cells coupled to the processor, wherein each sensor cell receiving a reflected light beam from the image object thereby capturing a pixel data of the image object;
- an address circuit connected to the sensor array for selectively accessing the sensor cells to retrieve captured pixel data; and
- an output circuit connected to the address circuit, the memory, and to the processor for digitally processing and outputting captured pixel data to the memory.

13. The digital image capturing apparatus of claim 12, wherein the sensor cells capturing accumulated charge generated in response to reflected light beams from the image object, the sensor cells converting voltages associated with the accumulated charge into digital pixel data, the sensor cells locally storing the digital pixel data.

14. The digital image capturing apparatus of claim 13, wherein each sensor cell comprising:
- a photosensor element for generating charge in response to an amount of light received;
- an analog circuit connected to the photosensor element and coupled to the processor, the analog circuit generating a captured signal indicating whether the accumulated charge generated by the photosensor element reaches a ramping voltage associated with an incrementing first count value; and
- a n-bit latching circuit connected to the analog circuit, the latching circuit receiving as input a second count value that is equivalent to the incrementing first count value, the latching circuit latching the second count value in response to the captured signal indicating the accumulated charge generated by the photosensor element reaches the ramping voltage associated with the incrementing first count value thereby generating the digital pixel data, wherein the time for frame read-out is adjustable to accommodate different data requirements.

15. The digital image capturing apparatus of claim 14, wherein the second count value is generated by a gray counter and the incrementing first count value is generated by a linear counter.

16. The digital image capturing apparatus of claim 9, wherein the motion control mechanism comprising:
- a first mirror assembly comprising a first micro-electro-mechanical actuator coupled to a first hinged mirror, the first micro-electro-mechanical actuator rotating the first hinged mirror to allow reflected light beam from the image object to be displaced along a first coordinate axis relative to the imager circuit thereby allowing the imager circuit to capture different complete frames of image pixel data of the image object at different mirror positions; and a second mirror assembly comprising a second micro-electro-mechanical actuator coupled to a second hinged mirror, the second micro-electro-mechanical actuator rotating the second hinged mirror to allow reflected light beam from the image object to be displaced along a second coordinate axis relative to the imager circuit thereby allowing the imager circuit to capture different complete frames of image pixel data of the image object at different mirror positions.

17. A method to capture an object image comprising:
a) capturing a complete first image frame of an object using a CMOS-based photosensor array;
b) storing the first image frame;
c) incrementally repositioning the photosensor array relative to the object by a distance;
d) capturing a different complete image frame of the object;
e) storing the different image frame;
f) repeat steps (c)–(e) for a predetermined number of times, wherein the photosensor array is incrementally repositioned according to a predetermined sequence designed to reduce the number of captured image frames, wherein the reduced number of frames of captured image pixel data are independent of a physical arrangement of sensor elements of the photosensor array; and
g) combining and processing data associated with the captured images to generate a high-resolution image.

18. The method of claim 17, wherein the predetermined times are determined based on an averaged distance between two adjacent sensor elements in the photosensor array and the incremental repositioning distance.

19. The method of claim 18, wherein the predetermined sequence is based on equations derived from fractal geometry.

20. The method of claim 17, wherein the time for frame read-out is adjustable to accommodate different data requirements.

21. A method to capture an object image comprising:
a) capturing a complete first image frame of an object using a CMOS-based photosensor array;
b) storing the first image frame;
c) incrementally displacing reflected light beams from the object relative to the photosensor array by a distance;
d) capturing a different complete image frame of the object;
e) storing the different image frame;
f) repeat steps (c)–(e) for a predetermined number of times, wherein the reflected light beams are incrementally displaced according to a predetermined sequence designed to reduce the number of captured images frames, wherein the reduced number of frames of captured image pixel data are independent of a physical arrangement of sensor elements of the photosensor array; and
g) combining and processing data associated with the captured images to generate a high-resolution image.

22. The method of claim 21, wherein the predetermined times are determined based on an averaged distance between two adjacent sensor elements in the photosensor array and the incremental displacing distance.

23. The method of claim 22, wherein the predetermined sequence is based on equations derived from fractal geometry.

24. The method of claim 21, wherein the time for frame read-out is adjustable to accommodate different data requirements.

* * * * *